(12) United States Patent
Patel et al.

(10) Patent No.: US 12,242,915 B1
(45) Date of Patent: Mar. 4, 2025

(54) PROVISIONING A SMART LABEL WITH MULTIPLE MICROCONTROLLERS

(71) Applicant: ROAMBEE Corporation, Santa Clara, CA (US)

(72) Inventors: Pankaj Patel, Santa Clara, CA (US); Vidya Subramanian, Santa Clara, CA (US)

(73) Assignee: ROAMBEE Corporation, Santa Clara, CA (US)

( * ) Notice: Subject to any disclaimer, the term of this patent is extended or adjusted under 35 U.S.C. 154(b) by 0 days.

(21) Appl. No.: 18/071,556

(22) Filed: Nov. 29, 2022

(51) Int. Cl.
*G06K 7/10* (2006.01)
(52) U.S. Cl.
CPC .................. *G06K 7/10366* (2013.01)
(58) Field of Classification Search
None
See application file for complete search history.

(56) References Cited

U.S. PATENT DOCUMENTS

| | | | |
|---|---|---|---|
| 6,010,257 A | 1/2000 | Petteruti et al. | |
| 6,593,853 B1 | 7/2003 | Barrett et al. | |
| 6,924,781 B1 | 8/2005 | Gelbman | |
| 7,715,593 B1 | 5/2010 | Adams et al. | |
| 7,741,967 B2 | 6/2010 | Valeriano et al. | |
| 7,791,481 B2 | 9/2010 | Landt et al. | |
| 7,922,073 B2 | 4/2011 | Huerga | |
| 9,239,941 B1 | 1/2016 | Diorio | |
| 11,232,390 B1 | 1/2022 | Leung et al. | |
| 11,321,652 B1 | 5/2022 | Mahmood | |
| 11,354,556 B1 | 6/2022 | Joehren | |
| 11,392,783 B2 | 7/2022 | Hilbert | |
| 2002/0138355 A1 | 9/2002 | Briggs et al. | |
| 2006/0192655 A1 | 8/2006 | Levin | |
| 2006/0275065 A1 | 12/2006 | Bunsey et al. | |
| 2007/0040683 A1 | 2/2007 | Oliver et al. | |
| 2008/0093027 A1 | 4/2008 | Niwa et al. | |
| 2011/0091216 A1 | 4/2011 | Addy | |
| 2014/0188502 A1 | 7/2014 | Defrank et al. | |
| 2016/0379102 A1 | 12/2016 | Ferguson | |
| 2017/0364927 A1 | 12/2017 | Atkinson et al. | |
| 2019/0279063 A1 | 9/2019 | Miettinen et al. | |
| 2019/0325174 A1* | 10/2019 | Ashaari | H04W 4/029 |
| 2019/0354734 A1* | 11/2019 | Forster | G06K 19/0704 |
| 2021/0081740 A1 | 3/2021 | Mak et al. | |
| 2021/0088387 A1 | 3/2021 | Bonifas et al. | |
| 2021/0383725 A1* | 12/2021 | Dehmubed | G09F 3/0292 |
| 2023/0015023 A1 | 1/2023 | Lauwers et al. | |
| 2023/0028603 A1 | 1/2023 | Volkerink et al. | |
| 2023/0157260 A1* | 5/2023 | Herron | A01K 29/005 340/573.3 |
| 2024/0029589 A1 | 1/2024 | Krejcarek | |

\* cited by examiner

*Primary Examiner* — Suezu Ellis

(57) ABSTRACT

A radio enabled label and method can include receiving data at an antenna embedded in a radio enabled label using a communication protocol, storing the data in a memory associated with a first microcontroller embedded in the radio enabled label, responsive to a radio communication event with the radio enabled label, forwarding the data to a second microcontroller embedded in the radio enabled label, and broadcasting a portion of the data by the second microcontroller using a different communication protocol.

9 Claims, 19 Drawing Sheets

PROVISIONING A SMART LABEL WITH MULTIPLE MICROCONTROLLERS

TECHNICAL FIELD

This application generally relates to radio embedded smart labels and more particularly to provisioning a smart label.

BACKGROUND

The costs for radio transmitting labels continues to fall and the demand to track goods in transit continues to rise. The conventional process includes a person wave a radio transmitter/receiver in front of a radio enabled (radio frequency (RF), radio frequency identification (RFID), near field communication (NFC), etc.) label or similar device, every time the shipment arrives or is sent out of a packaging and/or logistics facility. There may even be automatic radio readers which detect and log events and locations when the boxes, envelopes, etc., which include radio devices pass within a certain radius of the radio reader devices.

A large amount of time and a large number of devices are required to assign a code/identifier to a smart label, print content on the smart label, assign a code to the smart label, initiate the radio transmissions of the radio embedded in the smart label, update a database, track the label, further update the database after periods of time, notify interested parties of changes, confirm the smart labels are in a particular location and ensure the final destination is reached.

SUMMARY

One example embodiment may provide a method that includes one or more of receiving data at an antenna embedded in a radio enabled label using a communication protocol, storing the data in a memory associated with a first microcontroller embedded in the radio enabled label, responsive to a radio communication event with the radio enabled label, forwarding the data to a second microcontroller embedded in the radio enabled label, and broadcasting a portion of the data by the second microcontroller using a different communication protocol.

Another example embodiment may include a radio enabled label that includes a receiver configured to receive data at an antenna embedded in the radio enabled label using a communication protocol, a memory configured to store the data associated with a first microcontroller embedded in the radio enabled label, and a transmitter configured to forward the data to a second microcontroller embedded in the radio enabled label responsive to a radio communication event with the radio enabled label, and broadcast a portion of the data by the second microcontroller using a different communication protocol.

Still another example embodiment may include a non-transitory computer readable storage medium configured to store instructions that when executed cause a processor to perform receiving data at an antenna embedded in a radio enabled label using a communication protocol, storing the data in a memory associated with a first microcontroller embedded in the radio enabled label, responsive to a radio communication event with the radio enabled label, forwarding the data to a second microcontroller embedded in the radio enabled label, and broadcasting a portion of the data by the second microcontroller using a different communication protocol.

Yet another example embodiment may include a method that includes one or more of detecting, via a printer, a radio enabled label, retrieving, via the printer, an identifier from a local wireless communication device to assign to the radio enabled label, sending, via the printer, the identifier to a memory of the radio enabled label, and assigning the identifier to a plurality of microcontrollers embedded in the radio enabled label.

Yet another example embodiment may include a printer that includes a processor configured to detect a radio enabled label, retrieve an identifier from a local wireless communication device to assign to the radio enabled label, send the identifier to a memory of the radio enabled label, and assign the identifier to a plurality of microcontrollers embedded in the radio enabled label.

Still another example embodiment may include a non-transitory computer readable storage medium configured to store instructions that when executed cause a processor to perform detecting, via a printer, a radio enabled label, retrieving, via the printer, an identifier from a local wireless communication device to assign to the radio enabled label, sending, via the printer, the identifier to a memory of the radio enabled label, and assigning the identifier to a plurality of microcontrollers embedded in the radio enabled label.

Still yet another example embodiment may include a label that includes a top surface to retain printed content, a bottom surface with a plurality of electrical lead contacts to receive an electrical power charge from an external power source, a power storing element embedded between the top and bottom surfaces, one or more radio antennas, and one or more microprocessors configured to receive identifier information received by the one or more radio antennas.

Still another example embodiment may include a label that includes a top surface to retain printed content, a bottom surface with a plurality of electrical lead contacts to receive an electrical power charge from an external power source, and first and second microprocessors configured to receive identifier information received by the one or more radio antennas, wherein the first microprocessor receives provisioning data and forwards the provisioning data to the second microprocessor.

Yet still another example embodiment may include a label that includes a top surface, a bottom surface, a plurality of electrical lead contacts, and a plurality of capacitors connected to the plurality of electrical lead contacts, and the plurality of electrical lead contacts and the plurality of capacitors are embedded between the top surface and the bottom surface of the label.

Another example embodiment may include a label that includes a top surface, a bottom surface, a plurality of electrical lead contacts between the top and bottom surfaces, and a plurality of diodes connected to the plurality of electrical lead contacts, and the plurality of electrical lead contacts and the plurality of diodes are embedded between the top surface and the bottom surface of the label.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Figure 1A:
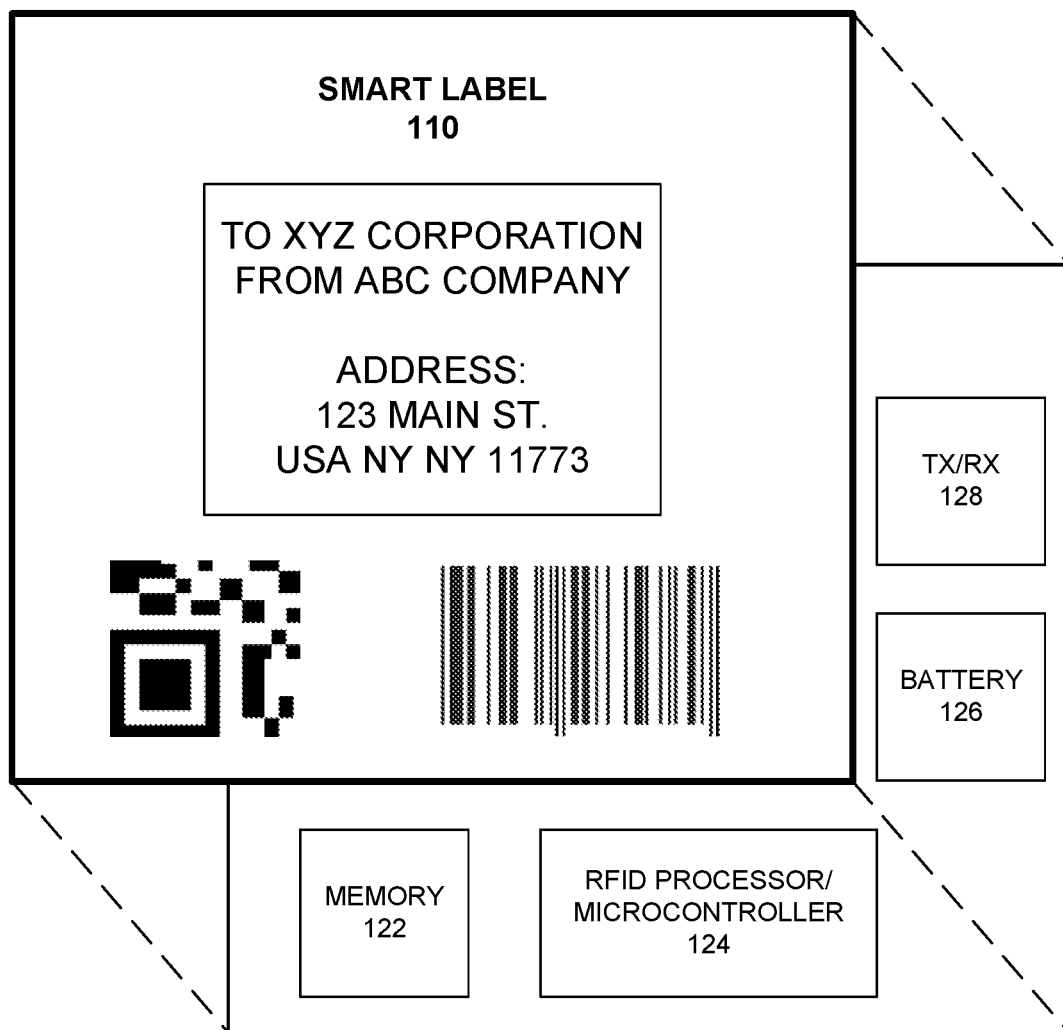
FIG. 1A illustrates a smart label with embedded hardware elements for corresponding communication and operation according to example embodiments.

FIG. 1A illustrates a smart label with embedded hardware elements for corresponding communication and operation according to example embodiments. Referring to FIG. 1A, the smart label configuration 110 may include a printable surface where a printer can print words and symbols received from a memory of the printer. The label may include printed information, such as name, locations, addresses, carrier information, content information, bar codes, QR codes, etc. The label may be substantially flat as a printable instrument like a piece of paper but obviously thicker to house the embedded hardware necessary to receive information to encode and store information in the smart label as well as transmit and receive information via the smart label. The label 110 may include a printable surface and underneath embedded components may include a transmitter/receiver (TX/RX) pair 128 including an antenna, a battery 126 to provide power to the transmitter/receiver and to a processor/microcontroller 124 and memory 122. The smart label 110 may have the capability to store information received wirelessly by a provisioning device such as a provisioning printer 200 (see FIG. 2). Also, the label may be two main layers and a center cavity with circuitry to enable the wireless communication.

Figure 1B:
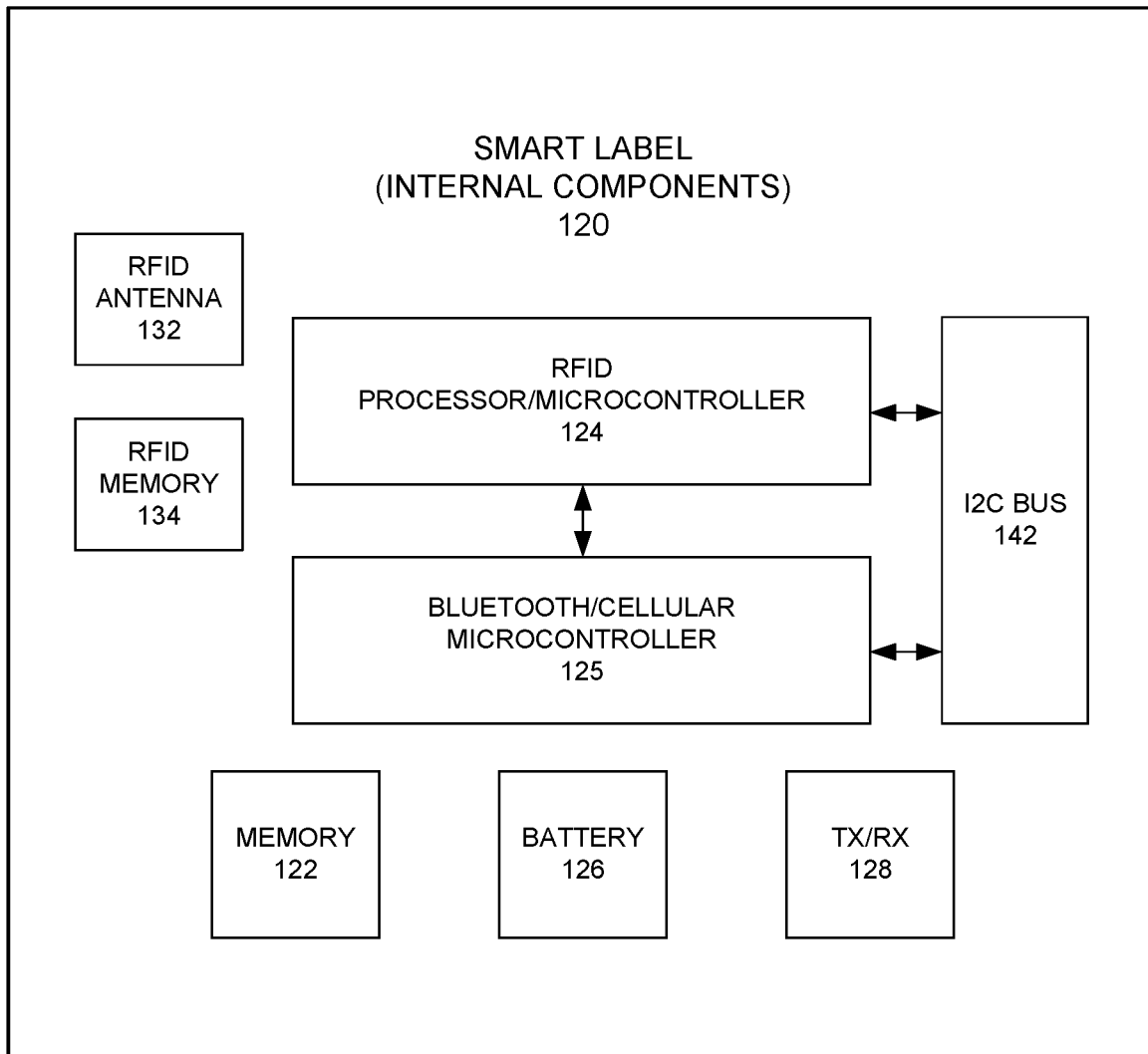
FIG. 1B illustrates a smart label with more than one microcontroller according to example embodiments.

FIG. 1B illustrates an example where the smart label 120 has more than one type of controller. In this example, the RFID microcontroller 124 may be provisioned by a radio device and the radio procedure may alert or "wake-up" the additional microcontroller 125, which may require more power and/or a different data interface to provision with a unique code or similar data. During the provisioning of the RFID tag, the information may be stored in a memory 134. Once the Bluetooth or cellular microcontroller 125 is needed, the provisioning may be performed to the memory 122 of the additional microcontroller prior to attempting to transmit a signal from the additional microcontroller 125. In other words, the first microcontroller 124 is provisioned with information and the second microcontroller 125 is provisioned by the first microcontroller 124.

An RFID label may be 'awakened' or 'energized' through an external reader device that comes within a communication range of the smart label 120 and the 'energy' received is used by the RFID controller 124 to receive via an antenna 132 and either store information in its memory 134 or to transmit its ID information to the reader device. The typical process of programming/provisioning an RFID device 124 includes the RFID reader reading a tag in front of the device 124 by sending out radio energy to the antenna 132, and sending and/or receiving an ID code. The RFID reader selects a single ID code and forwards it while operating in a programming mode of operation and then sends the ID to the chip/microcontroller 124. The RFID chip 124 stores the ID in its own memory 134. The process of moving the ID from the RFID reader is initiated by the RFID chip 124 and cannot be performed by a secondary microprocessor. The process of sharing the ID will include the RFID chip 124 writing the ID to a memory 134 of the other microcontroller 125 and also sending a signal on a communications channel (I2C Bus 142) between the RFID chip 124 and the second microprocessor 125. The signal will indicate to the microprocessor 125 that data is being sent. The microprocessor 125 will read the data and store it in a secondary memory 122 that can be read by all radio chips in the label. The secondary radio chip(s) 125 (e.g., Bluetooth-BLE, cellular-GSM, LTE, etc.) will read the memory location 122 for a "broadcast ID" and then begin to broadcast the ID through respective radio protocols. The provisioning of the secondary controller chips 125 may be performed at a later time after the primary RFID chip 124 is provisioned with the ID. The decision to wait may be based on saved energy since the BLE or cellular chip will use significantly more energy, the RFID chip may wait a predetermined period of time before attempting to provision the other microcontroller 125. For example, as the chip moves with a shipment to a location where BLE or cellular communication is necessary for updated status information, then the BLE chip may be provisioned accordingly and may then be able to start broadcasting its own ID via BLE and/or cellular protocols. The RFID chip may have instructions to not provision the BLE chip for 'X' days or until a certain access operation occurs indicating that the label is in transit. Then the provisioning of the secondary microcontroller may occur so the ID can be shared via a different protocol.

In one example, an RFID printer may emit a radio wave that programs a RFID tag, once this occurs, another circuit may read and confirm the information and extract the information or intercept the ID as programmed in the RFID microcontroller and then attempt to programs the other microcontroller that is compatible with BLE/Bluetooth and/or cellular. The ability to track a shipment via RFID and other communication mediums is then possible since the ID assigned to the smart label is provided from the original server (e.g., unique ID) and programmed into the microcontroller and in a database maintained by the server. The same ID should be assigned to cellular and/or Bluetooth and the microprocessor can then transmit that ID.

Figure 2:
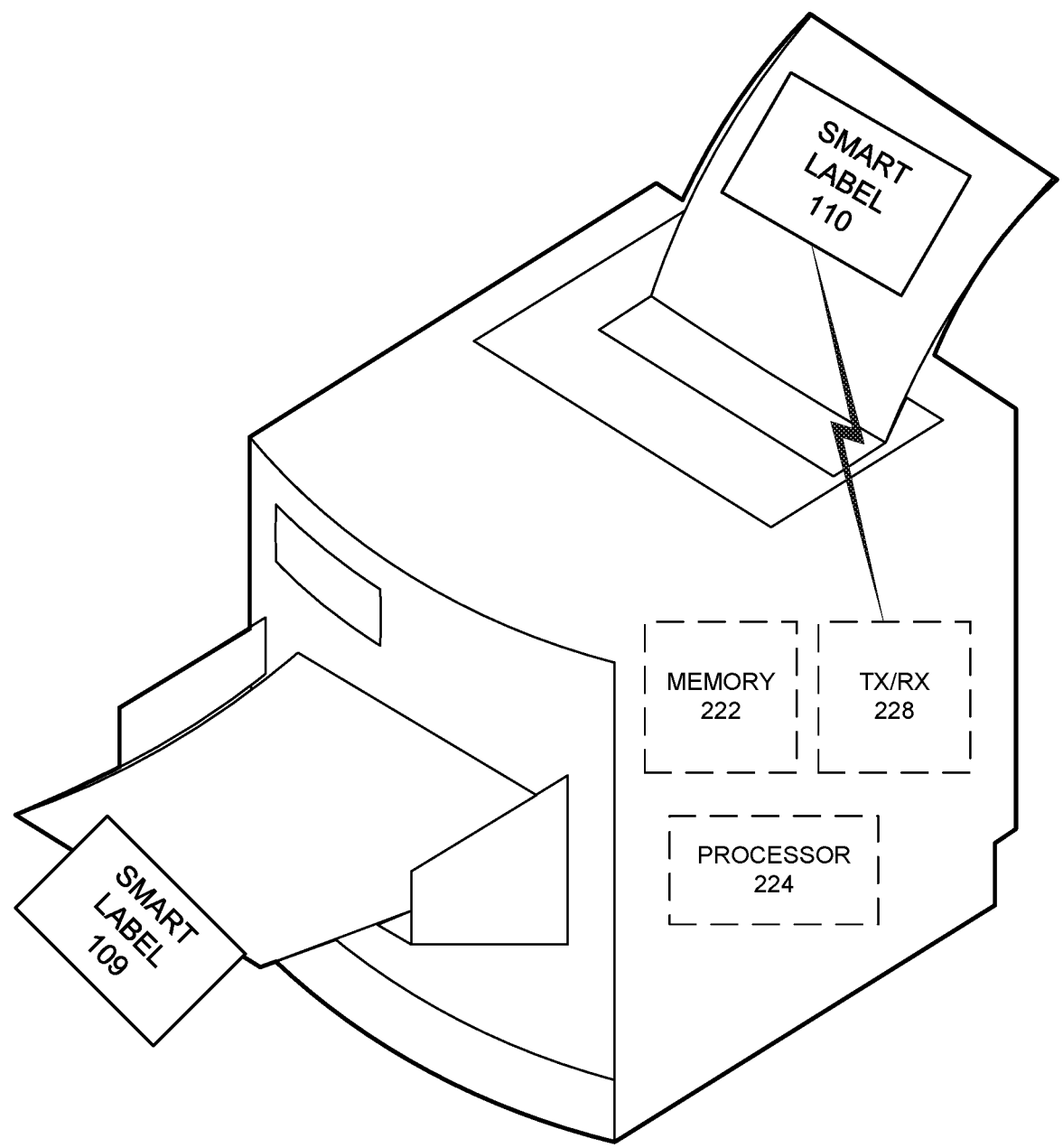
FIG. 2 illustrates a smart label printer configuration according to example embodiments.

FIG. 2 illustrates a smart label printer configuration according to example embodiments. Referring to FIG. 2, the radio provisioning printer 200 may include a standard printing architecture including ink, paper rolling mechanisms and motion caused by motors, gears and related components (not shown) necessary to move paper through the printer and print onto a surface of the paper. However, in addition to being capable of printing, the printer may have a radio encoding device that forwards a wireless signal to the smart label as it passes through the printer. The printer 200 may receive provisioning information from a local computer via a wired or wireless communication to the printer 200. The information may be stored in the printer memory 222. The printer processor 224 may transmit a command to the transmitter/receiver 228 to initiate a radio assignment process where the information printed on the label surface is stored in a memory of the smart label, as well as information pertaining to what wireless communication protocol to use (cellular, Wi-Fi, Bluetooth, Bluetooth low energy (BLE), LoRA, SigFox, etc.), when to transmit update information (e.g., once a day, once a week, once an hour, etc.).

In operation, when a smart label 110 has entered the printer 200 and information is printed on the label surface, the tag may be provisioned to assign specific information to the smart label. The embedded RFID tag or related hardware of the smart label and its embedded communication circuit (Cellular, Wi-Fi, BLE, etc.) will extract/read the RFID tag details and send the information directly from the smart label to a cloud server and/or directly from the smart label to the printer which has a network interface to communicate with a local computing device which connects to the Internet and shares the smart label information with a server and database to update a new record for the recently provisioned smart label. The process of assigning information to the tag, reading the RFID tag information assigned and communicating the information the cloud may all be part of the provisioning of the smart label 110. The smart label 110 is illustrated as entering the printer and the smart label 109 is illustrated as having already been provisioned by the printer.

In another example, when a smart Internet of things (IoT) label/device (e.g., sensor, location identifier, cellular compatible, Wi-Fi compatible, etc.) is added to the smart label, the RFID identifier and the smart IoT label/device identifier need to both be identified. The RFID tag and the smart IoT label/device will require the capability to read/write embedded the RFID tag independent of the RFID reader or writer and automate the process of provisioning or combining the smart label/device and the RFID identifiers. The smart label should be capable of accessing the embedded RFID information and sending the information to the Internet and on to a cloud server and to create assignment/combinations of provisioning, activating the journey/device with no user interactions.

One example method of operation may include identifying, via a printer, such as a smart label communicative printer, a smart label with an embedded radio chip with memory and a powers source among other hardware components. The process may also include retrieving, via the printer, an identifier to assign to the smart label, printing, via the printer, label information on the smart label while moving the label through a printer track of the printer, and assigning, via a transmitter radio of the printer, identifier information to the memory during the smart label printing. The process may also include broadcasting the identifier information to a computing device which forwards the identifier information to a database and transmitting a beacon signal to the smart label to identify a location of the smart label after the identifier information is stored in the database. Once the smart label is provisioned and activated via the printer, the smart label automatically establishes communications with the remote management server and the corresponding database so the updates of location and status can be maintained from the moment the smart label is setup.

Figure 3:
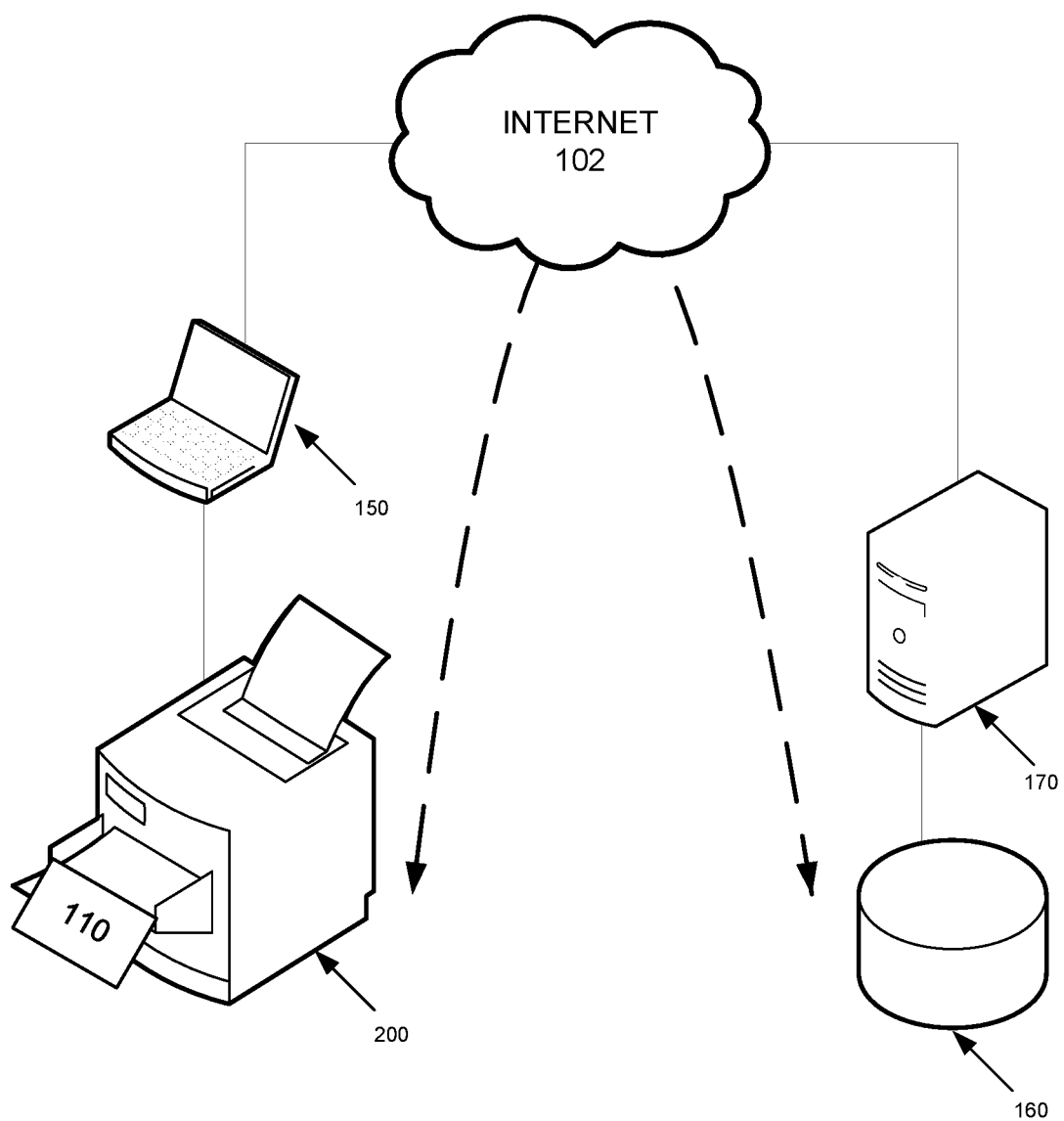
FIG. 3 illustrates a network configuration of the system devices included in a smart label provisioning process according to example embodiments.

FIG. 3 illustrates a network configuration 300 of the system devices included in a smart label provisioning process according to example embodiments. Referring to FIG. 3, the example network configuration demonstrates the devices which may be necessary to achieve a communication flow of information from the printer 200 and the initial provisioning of the smart label 110 all the way to the master server 170 and the corresponding database 160 which stores the records of the labels and their corresponding identifier information. The local computer 150 may provide an access point for the label 110 and/or the printer 200 to send/receive messages which are sent and received across the Internet 102 to a remote server 170 and/or a corresponding database that manages the lifespan and updates associated with the smart labels.

Figure 4A:
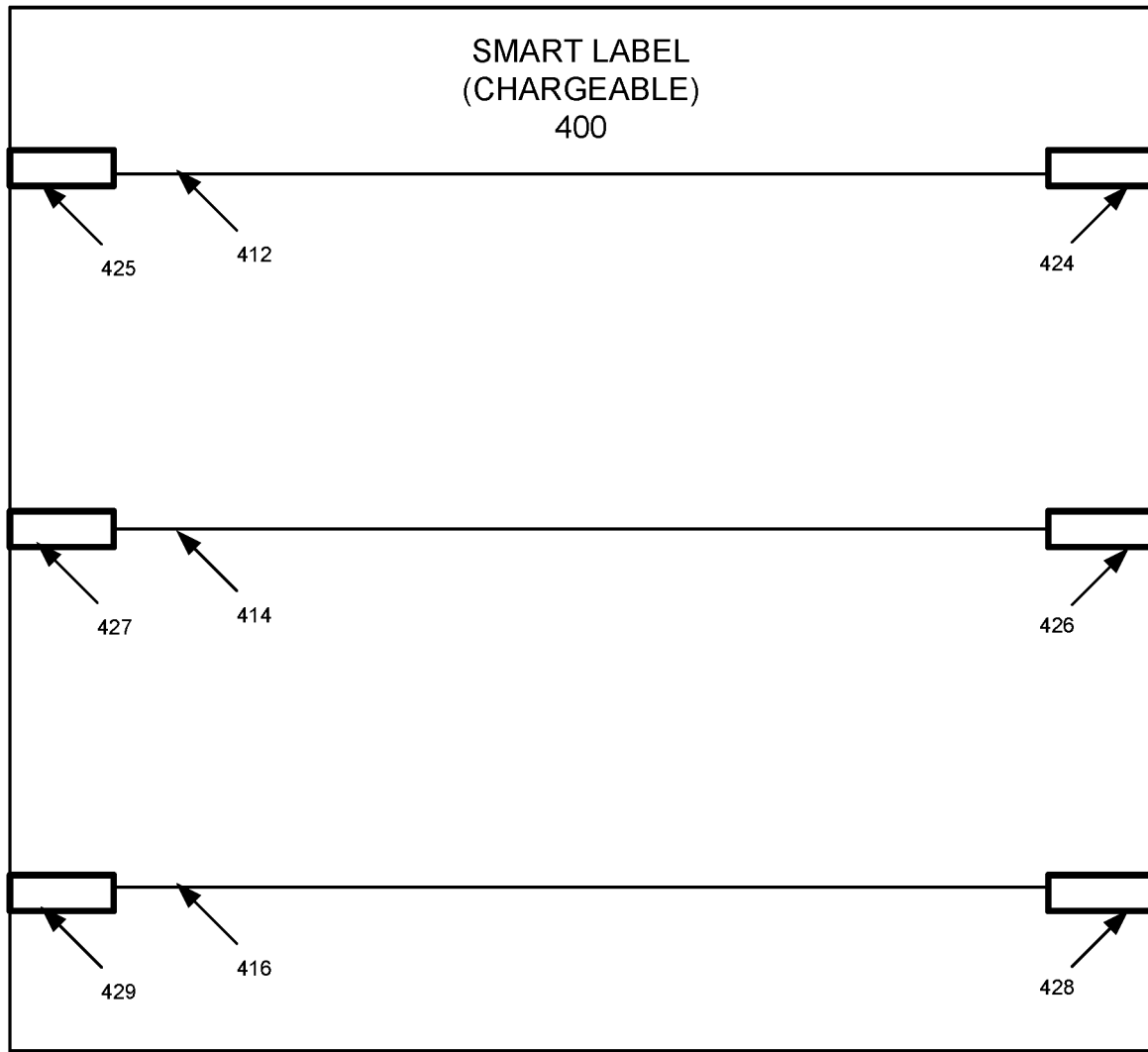
FIG. 4A illustrates an example of a smart label with power distributing conduits according to example embodiments.

FIG. 4A illustrates an example of a smart label with power distributing conduits according to example embodiments. Referring to FIG. 4A, the smart label 400 includes one or more of the internal/embedded elements and control devices identified in FIG. 1B, however, in this example, the smart label 400 may also include a set of conduits 412-416 which are laid across the electrical charging surface contacts 424/425, 426/427 and 428/429. The contacts may be positive, negative and ground to offer a charging source a way to provide power to the chargeable smart label 400.

Figure 4B:
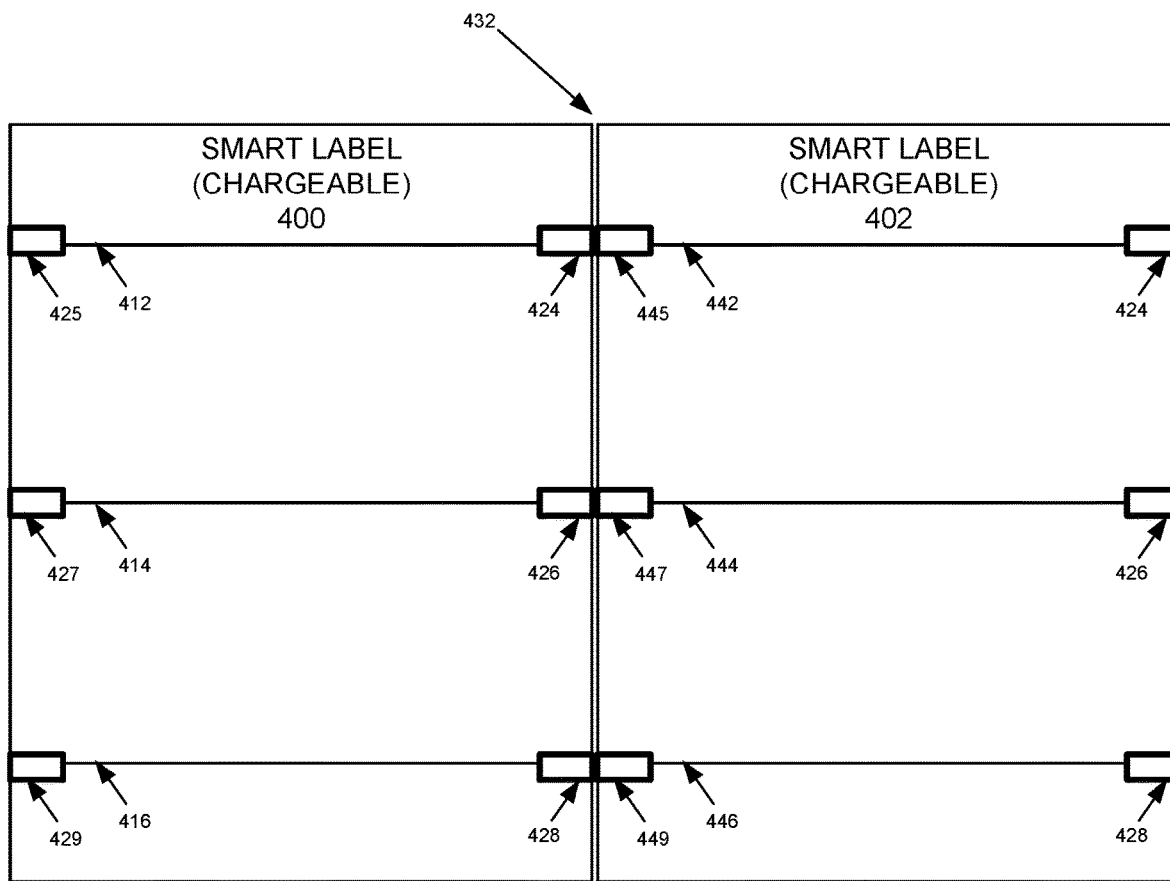
FIG. 4B illustrates an example of chargeable smart labels connected by a tearable boundary with power distributing conduits according to example embodiments.

FIG. 4B illustrates an example of chargeable smart labels connected by a tearable boundary with power distributing conduits according to example embodiments. Referring to FIG. 4B, the two smart labels 400 and 402 may be part of a stack of labels which are fan-folded similar to printer paper for a dot matrix type of printer. The fold 432 may permit the tearable connection portion (seem 432) to be torn which would sever the electrical conduits from making contact from one smart label 400 to another 402. When the labels 400 and 402 are connected, the electrical power distributed from one label to another through the conduits 412-416 and 442-446 and contact pads 424-428 and 425-429 on label 400 and contact pads 445-449 and 424-428 on label 402.

Figure 4C:
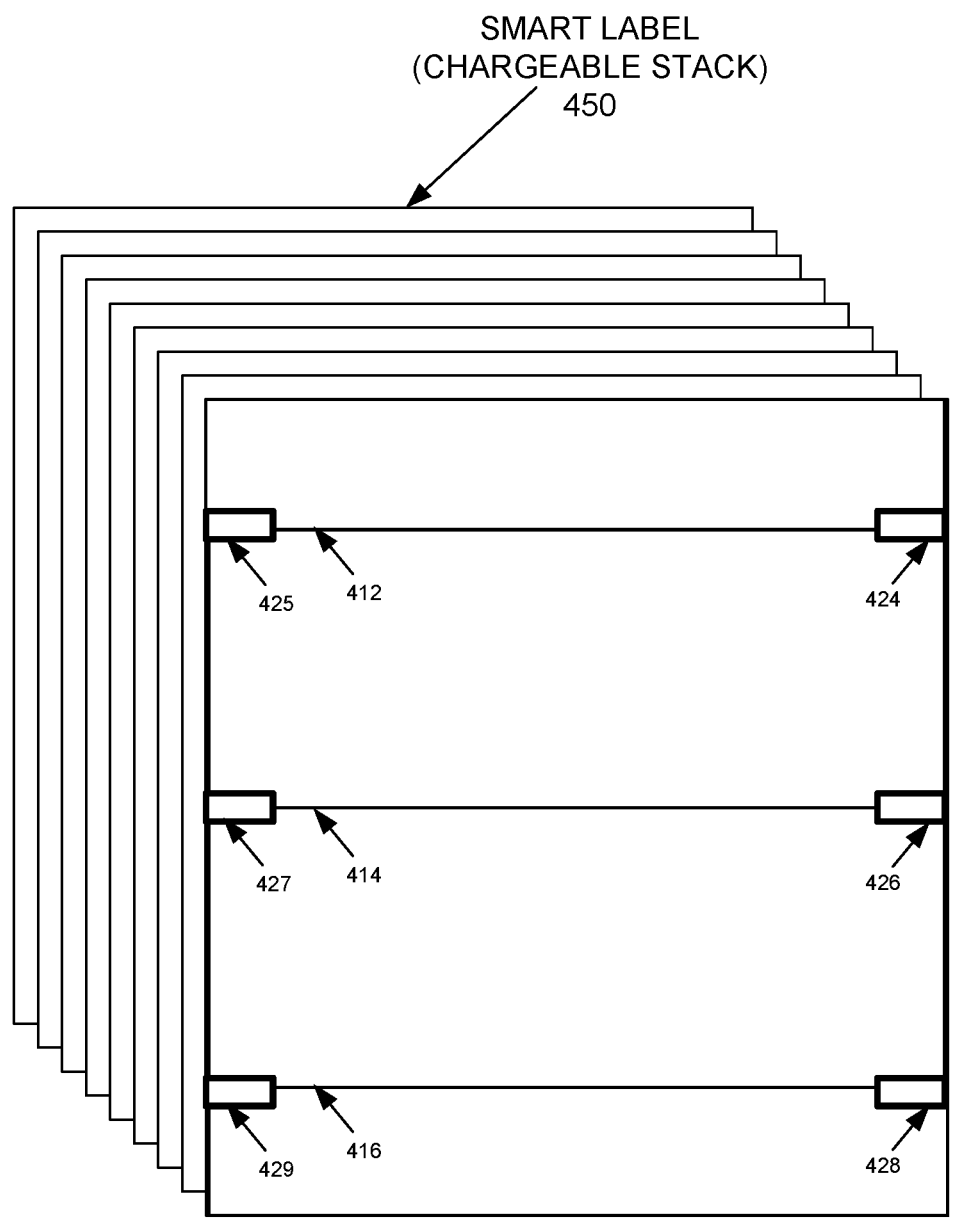
FIG. 4C illustrates an example of stackable smart labels with power distributing conduits according to example embodiments.

FIG. 4C illustrates an example of stackable smart labels with power distributing conduits according to example embodiments. Referring to FIG. 4C, the example of a chargeable stack of smart labels 450 demonstrates how a large quantity of fan-folded labels may be connected to one another via a paper material with perforations permitting a tear away operation. Also, the perforations may be small enough so as not to interfere with the electrical conduits which move electrical charge from the contact pads of one smart label to the contact pads of another while the conduits are in connection with a battery or other smart label component. As the stack is resting in a stacked position, an electrical source may provide power to the stacked access points or terminals 425-429 and 424-428 at either the top or bottom of the stack. The stack may be vertical with many smart labels resting on top of each other (e.g., dozens, hundreds, thousands, etc.). The stack may include fan-folded labels with alternating connecting sides for a smooth transfer to a printer. Or, the labels may not be connected and may provide charge via direct contact between the access points in a vertical stacked position.

Figure 4D:
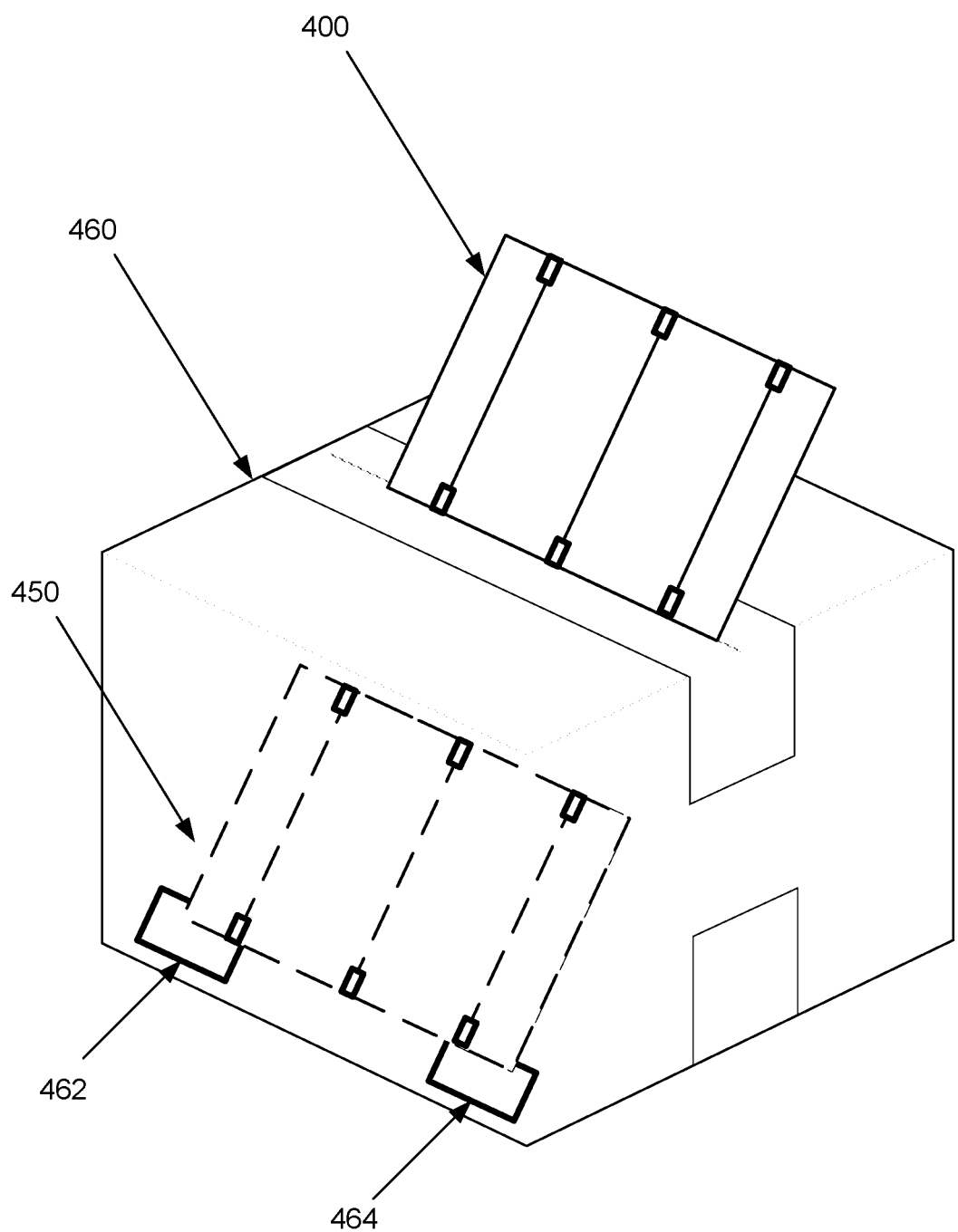
FIG. 4D illustrates an example of smart labels with power distributing conduits in a storage container according to example embodiments.

FIG. 4D illustrates an example of smart labels with power distributing conduits charging in a storage container according to example embodiments. Referring to FIG. 4D, the container 460 may be a box or a portion of a printer that is used to keep the stack in a fixed position or to avoid the stack becoming disheveled. In this example, the topmost smart label 400 is slidably moved up through a slot in the container 460. The smart label 400 may be the next label to be fed into a smart label printer. The stack of other smart labels 450 is located inside the container 460 and may be fan-folded in an alternating and overlapping position so each smart label is resting on top of one another and the bottom label is in contact with power providing electrical contact pads or leads 462 and 464, which may be connected to a battery or other electrical source to provide power to all the labels in the stack.

Figure 4E:
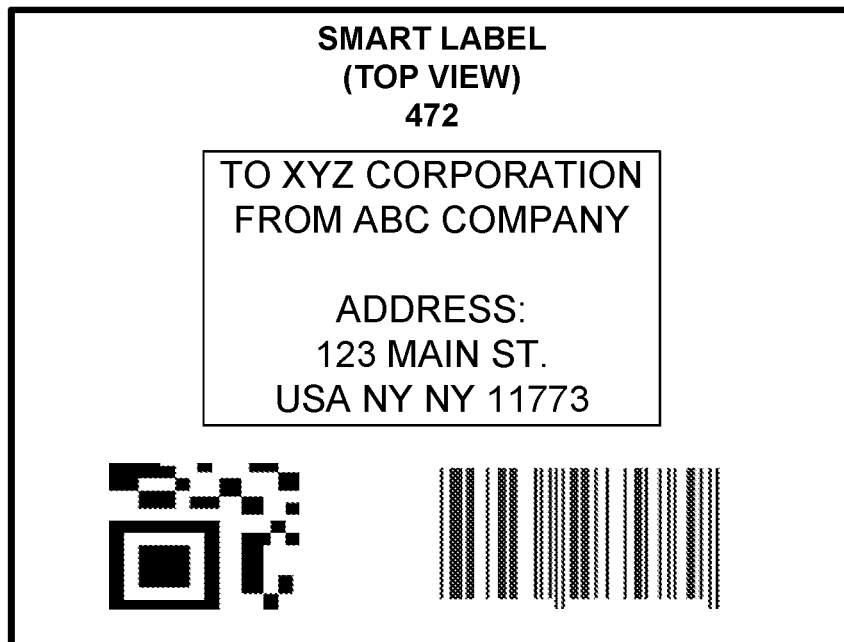
FIG. 4E illustrates an example of a top view of a smart label with power distributing conduits according to example embodiments.

FIG. 4E illustrates an example of a top view of a smart label with power distributing conduits according to example embodiments. Referring to FIG. 4E, the smart label top view 472 demonstrates the content printed on the face of the smart label by the smart label printer. Within the label may be the contents identified in other example embodiments including elements which require power and/or charge. The printer may receive a signal from a communication line (wired or wireless) and may print content on the label in accordance with the assigned information for that particular label. The printer may also activate or communicate with a receiver on the smart label to assign the information and/or to activate the smart label radio functions (e.g., RFID, BLE, Bluetooth, cellular, etc.).

Figure 4F:
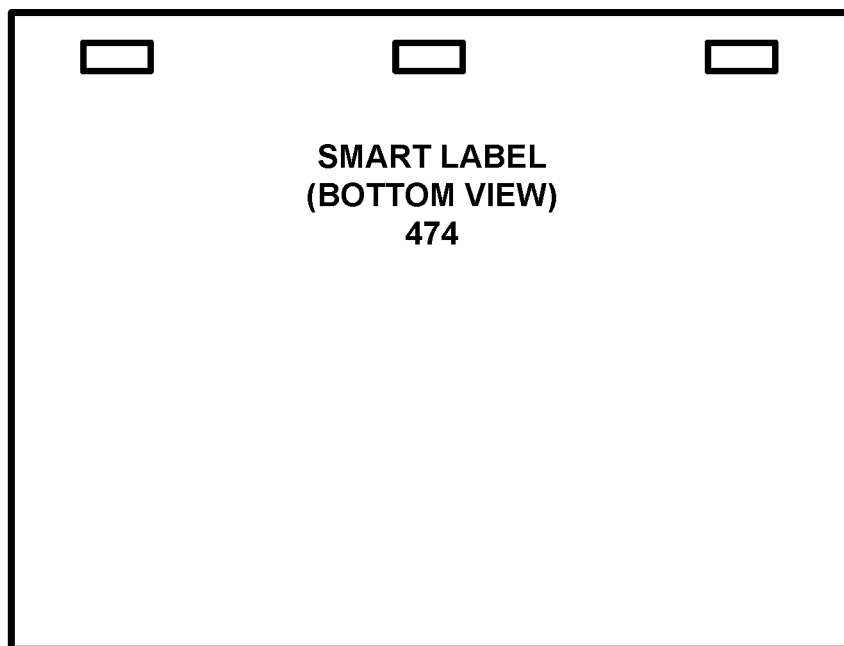
FIG. 4F illustrates an example of a bottom view of a smart label with power distributing conduits according to example embodiments.

FIG. 4F illustrates an example of a bottom view of a smart label with power distributing conduits according to example embodiments. Referring to FIG. 4F, the back side or bottom view 474 of the label may have the various connection leads or battery access points which can allow charge to pass from a charging device into the conduits and electrical elements of the smart label. Also, the stack of labels permits the charge to pass through any other label in contact with the smart label that is making the direct contiguous contact with the charging source.

Figure 5A:
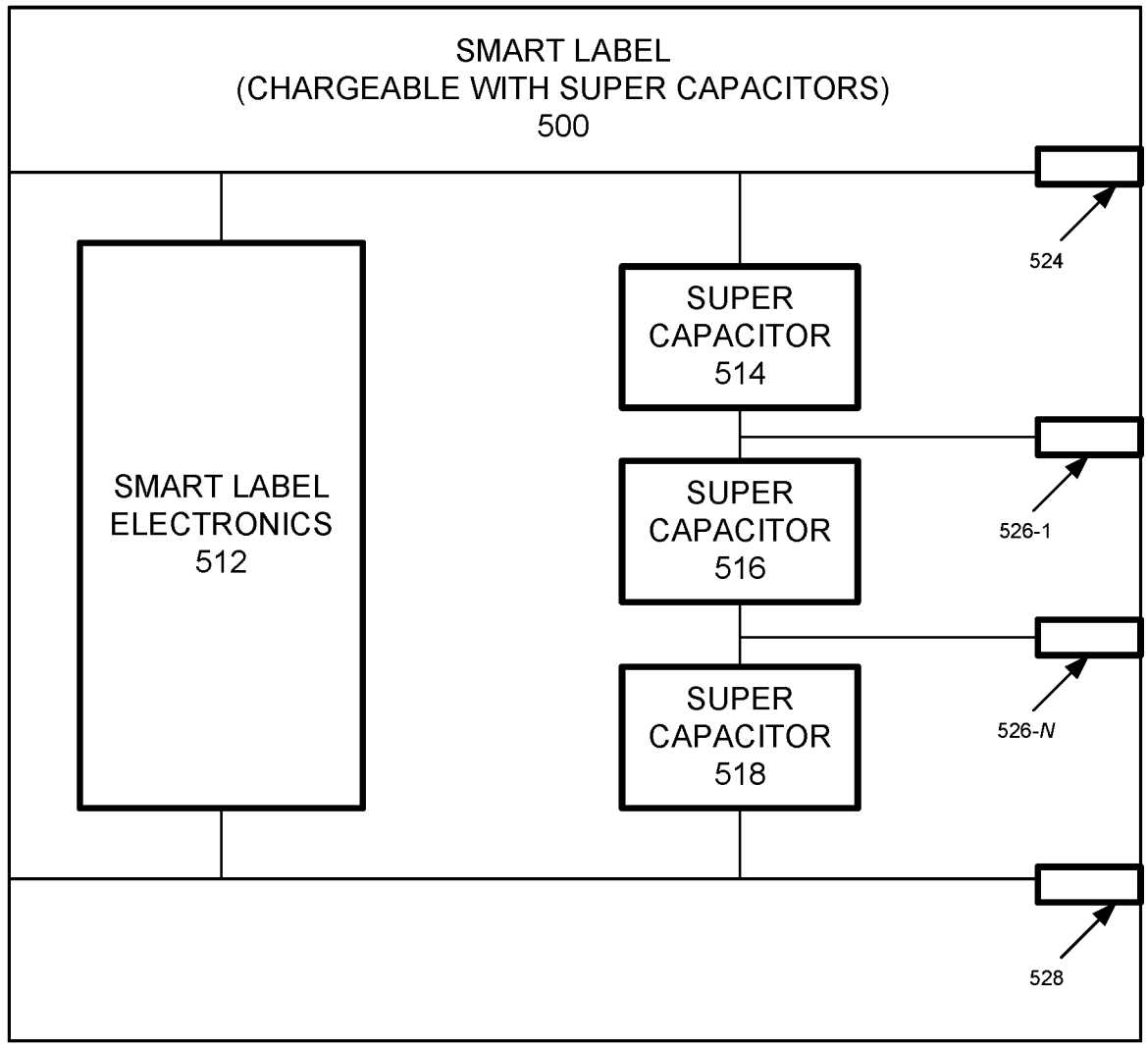
FIG. 5A illustrates a smart label configuration with one or more super capacitor elements included in the embedded label to store and provide charge to the smart label components according to example embodiments.

FIG. 5A illustrates a smart label configuration with one or more super capacitor elements included in the embedded label to store and provide charge to the smart label components according to example embodiments. Referring to FIG. 5A, the example smart label 500 includes the smart label electronic components 512 described with reference to one or more of the other examples (e.g., RFID controller, BLE controller, cellular controller, battery, antenna, transmitter/receiver, etc.). In this example, there may be N number of super capacitors 514-518. The middle tabs 526-1, 516-N may also include N number of middle tabs which provide a charge interface for the respective number of super capacitors. When the smart labels are laid flat together, the external charging unit 550 (see FIG. 5B) may provide a charge to each of them in parallel or in a combination of parallel and series.

Figure 5B:
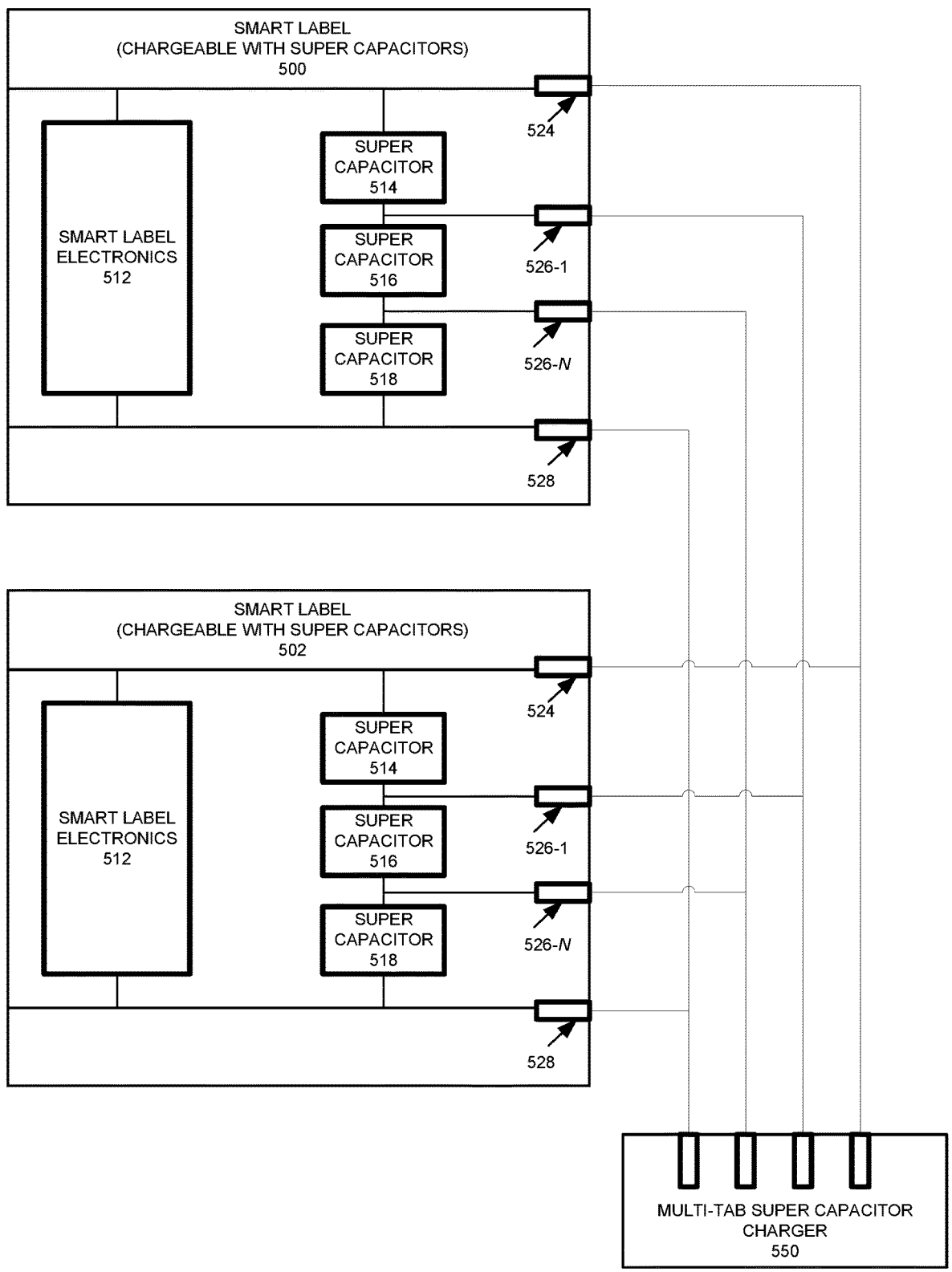
FIG. 5B illustrates multiple smart labels with one or more super capacitor elements being charged in parallel by a charging source according to example embodiments.

FIG. 5B illustrates multiple smart labels with one or more super capacitor elements being charged in parallel by a charging source according to example embodiments. Referring to FIG. 5B, the smart labels 500 and 502 may be laid on top of one another in a stack configuration and receive parallel charge by contact with a tab from one directly in contact with a similar tab below or above the tab. The top or bottom of the stack may be in direct contact with a super capacitor charger 550 with multiple tabs to provide charge to any tab in contact with the charger 550. Also, the amount of charge may quickly be transferred to the smart labels since the super capacitors are designed to receive a large amount of charge and to then 'trickle charge' and dispense the charge to a battery unit over a longer period of time than the time required to charge the capacitors, such as in the example of FIG. 5C, or directly to the smart label electronics for a period of time until the super capacitors lose their ability to discharge and 'trickle charge' to the elements in contact within the smart label.

The capacitors in the same smart label may be in a series configuration and the capacitors in different labels may charge in parallel. The amount of charge 'Q'=CV, where C is the capacitance in Farads and V is the voltage across the capacitor in volts. Q may be measured in coulombs (C). The energy stored may be denoted 'W'=½ QV, where W is the energy in joules. The center tab(s) provides a way for the capacitors to charge in parallel within their voltage limit and current capacity.

Figure 5C:
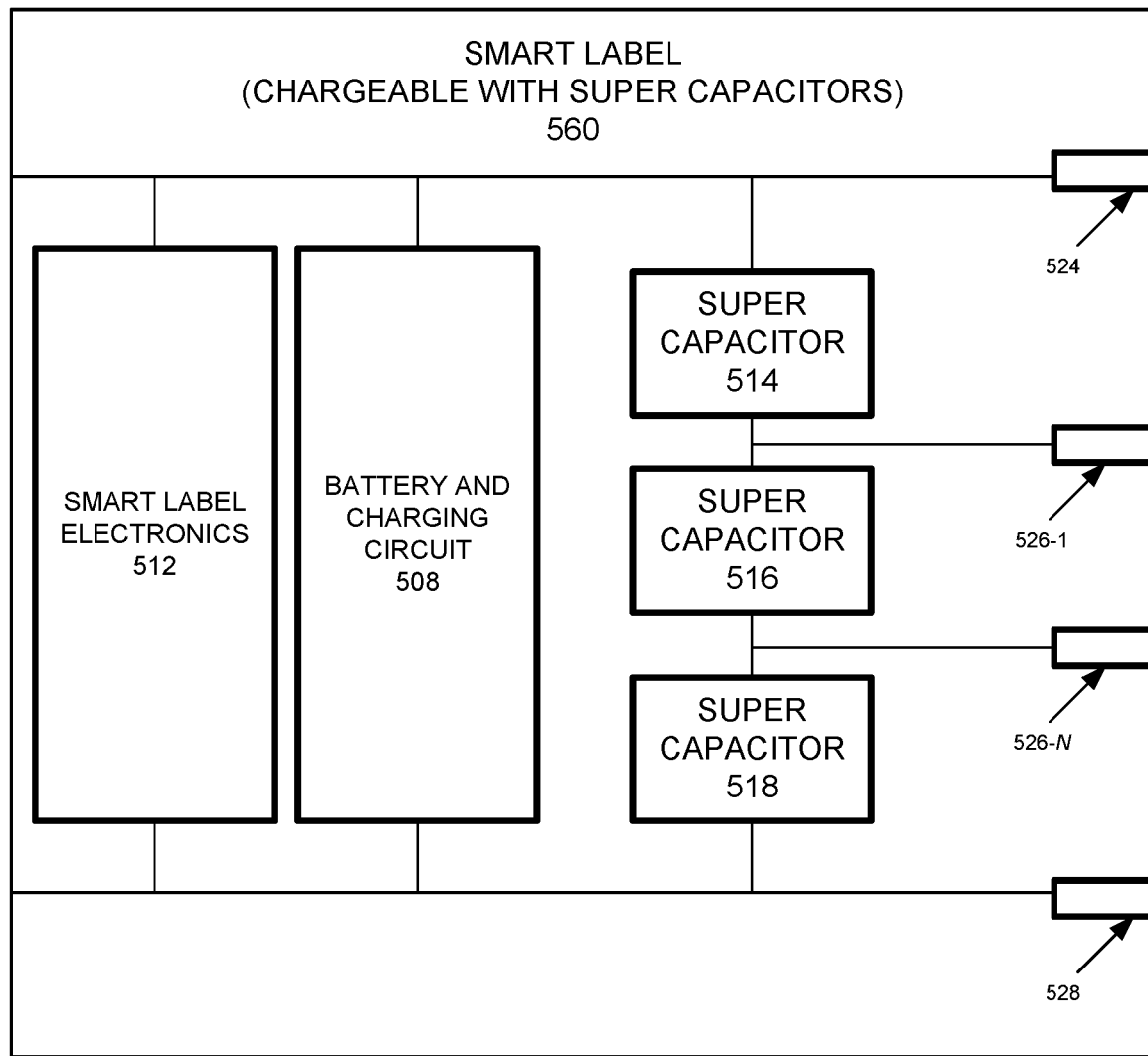
FIG. 5C illustrates another smart label configuration with one or more super capacitor elements and a battery charging circuit included in the embedded label to store and provide charge to the smart label components according to example embodiments.

FIG. 5C illustrates another smart label configuration with one or more super capacitor elements and a battery charging circuit included in the embedded label to store and provide charge to the smart label components according to example embodiments. Referring to FIG. 5C, the example smart label 560 may include a battery and charging unit 508 which receives the charge from the super capacitors 514-518 over a period of time and charges its internal battery which can then power the smart label electronic elements 512 for a period of time. The BLE and/or cellular controllers may then transmit a signal, which may require more energy than the RFID controller, for a period of time until a charge is needed to replenish the battery or other components of the smart label.

Figure 5D:
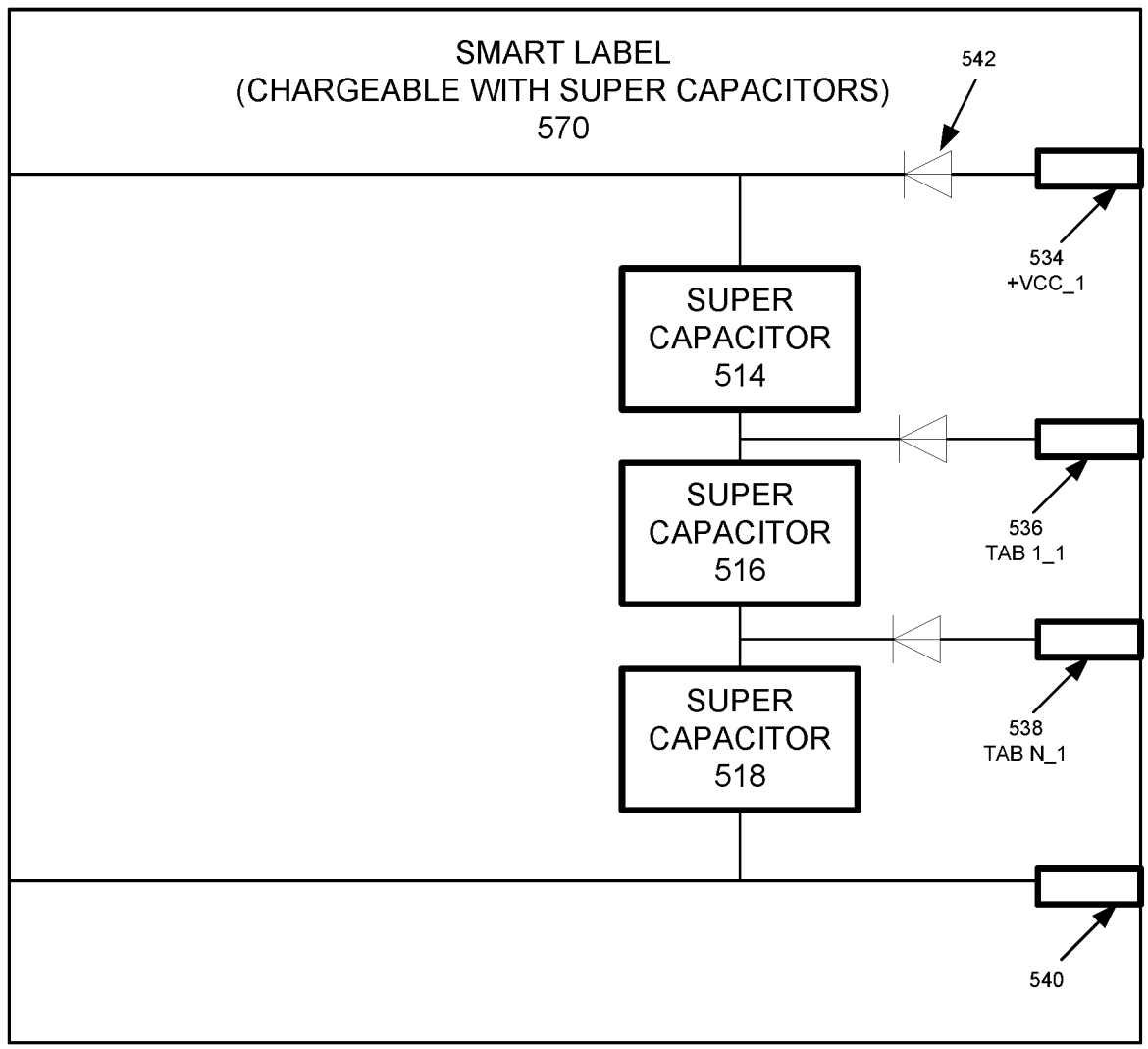
FIG. 5D illustrates another smart label configuration with one or more super capacitor elements and one or more diodes included in the embedded label according to example embodiments.

FIG. 5D illustrates another smart label configuration 570 with one or more super capacitor elements and one or more diodes included in the embedded label according to example embodiments. Referring to FIG. 5D, the positions of the tabs 534, 536 and 538 may vary to accommodate charging from a staggered set of charge strip positions (see FIG. 5G). The charge strips may be based on an external charge source positioned at the top or bottom of a stack or rolls of labels. The strips may also be embedded in the body of the labels so each charge terminal (+Vcc (1-N), Tab (1-N), Tab (N-N) and GND (1-N)) has two or more strips which could make contact with a charging source. In the example of FIG. 5G, there are 10 possible strips, however, this number could change depending on the configuration. FIG. 5D demonstrates a first position set of the charging tabs or electrical lead contacts (used interchangeably). Also, diodes 542 are placed between the capacitors 514-518 and the charging tabs.

Figure 5E:
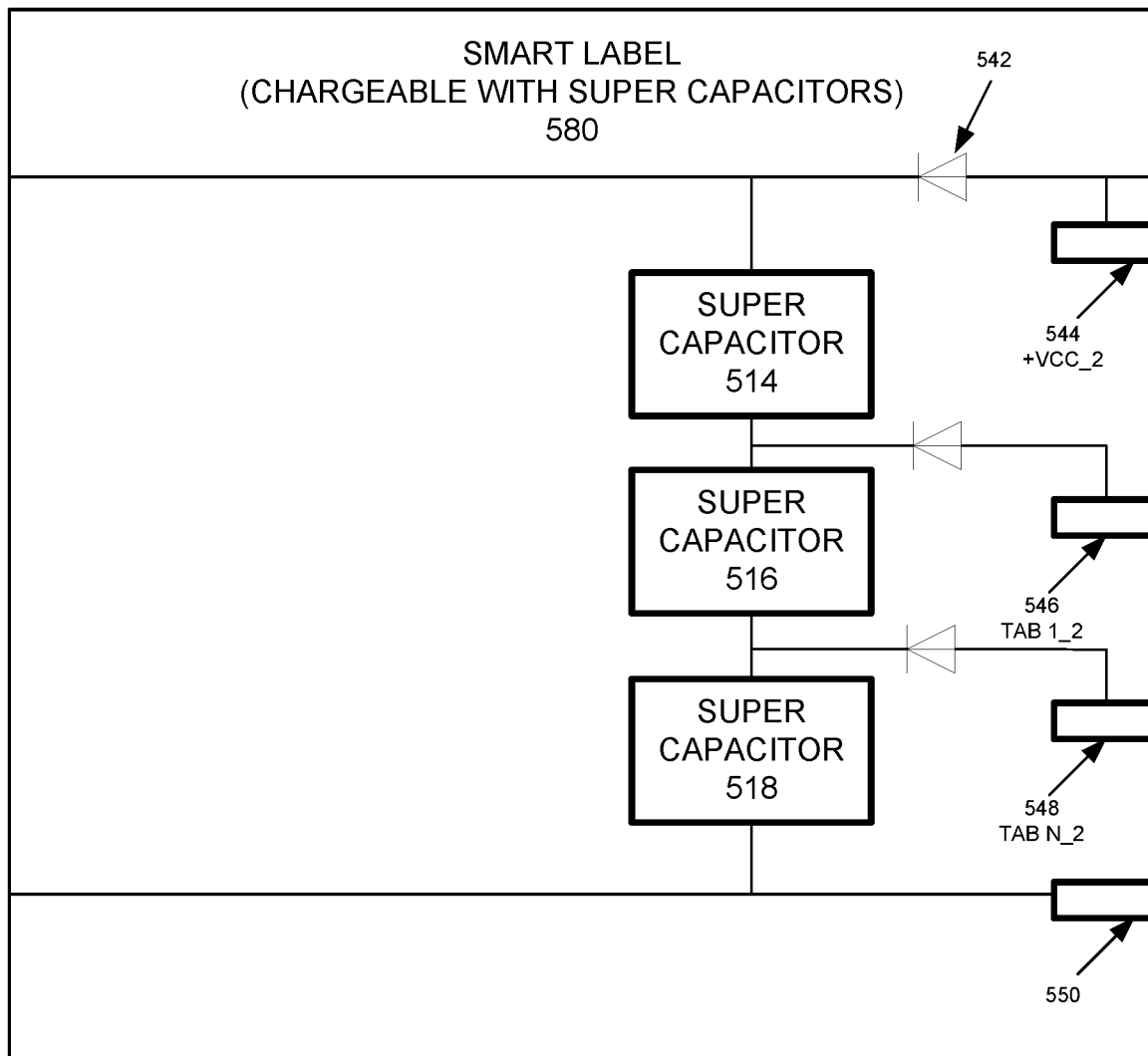
FIG. 5E illustrates another smart label configuration with off-set charging tabs, one or more super capacitor elements and one or more diodes included in the embedded label according to example embodiments.

FIG. 5E illustrates another smart label configuration 580 with off-set charging tabs, one or more super capacitor elements and one or more diodes included in the embedded label according to example embodiments. Referring to FIG. 5E, the charging tabs 544-548 would make contact with a different set of strips and the ground 550 to accommodate a staggered position from the first position of FIG. 5D.

Figure 5F:
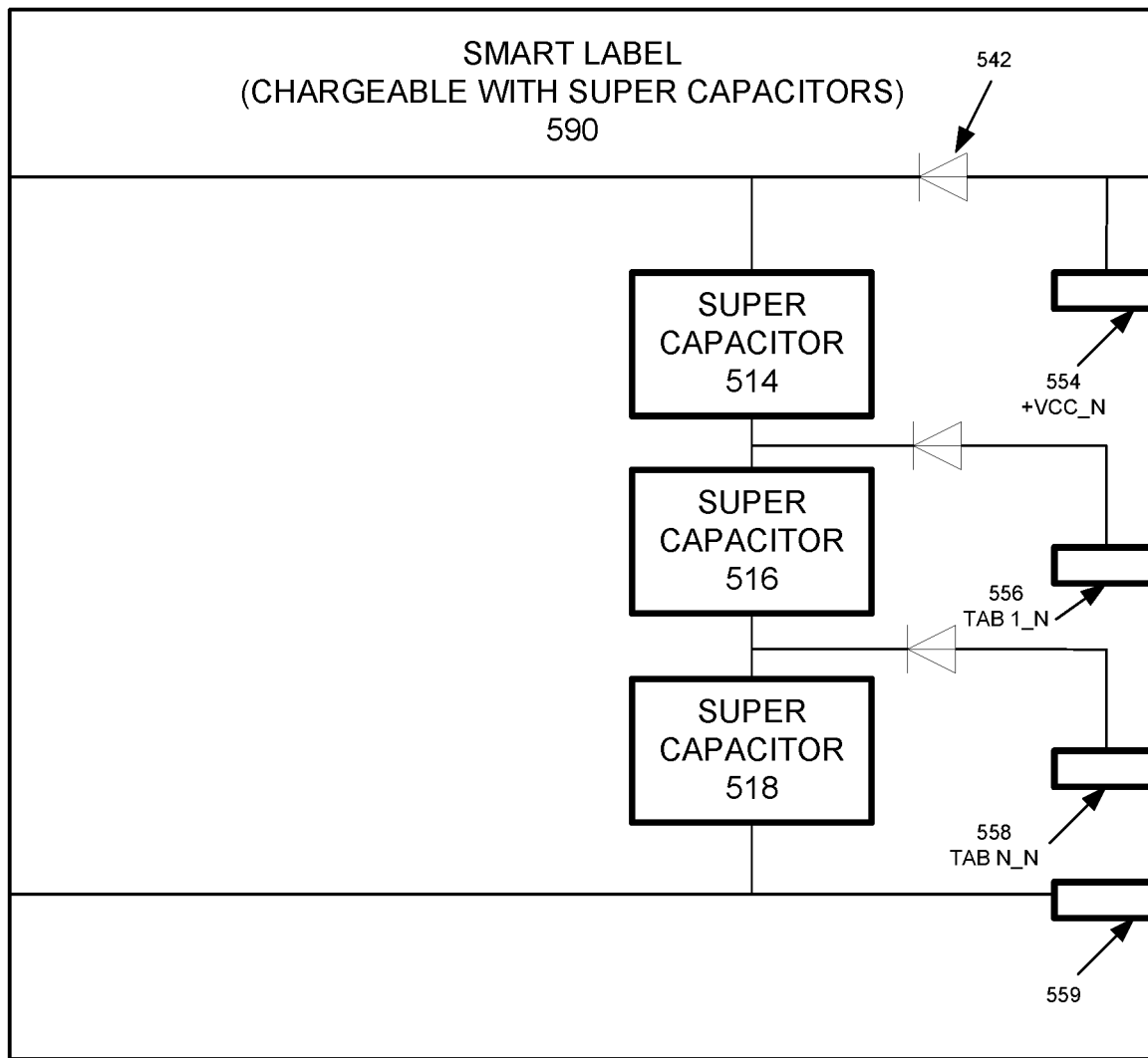
FIG. 5F illustrates another smart label configuration with further off-set charging tabs, one or more super capacitor elements and one or more diodes included in the embedded label according to example embodiments.
Figure 5G:
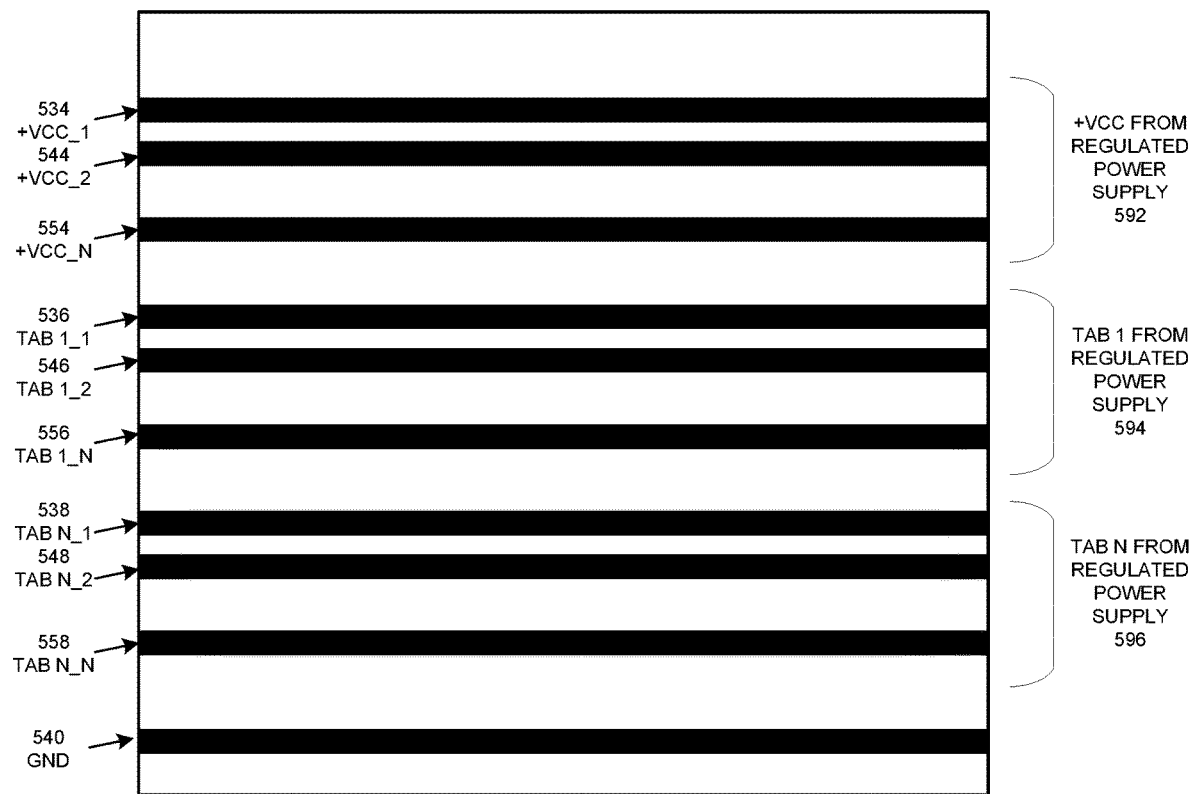
FIG. 5G illustrates charging strips for accommodating various different charging tab configurations which are staggered for various smart labels in a stack according to example embodiments.

FIG. 5F illustrates another smart label configuration 590 with further off-set charging tabs, one or more super capacitor elements and one or more diodes included in the embedded label according to example embodiments. Referring to FIG. 5F, the charging tabs 554-558 would make contact with a different set of strips and the ground 559 to accommodate another staggered position from the first position of FIG. 5D and the second position of FIG. 5E. The diodes may provide a reverse voltage protection for each charging tab.

FIG. 5G illustrates charging strips for accommodating various different charging tab configurations which are staggered for various smart labels in a stack according to example embodiments. Referring to FIG. 5G, the various strips demonstrate how the strip positions which could make contact with the three staggered positions of the examples in FIGS. 5D, 5E and 5F. Each set of three strips includes a same voltage source 592, 594 and 596. The first group of strips demonstrate three different positions for the first positive voltage sources 534-554 VCC. The next group of strips is for the first tab sets 536-556, the next group is for the group of N tabs 538-558 and the last is for the GND 540 strip. Having more options for voltage application strips permits different arrangements and stackings of smart labels.

Figure 6A:
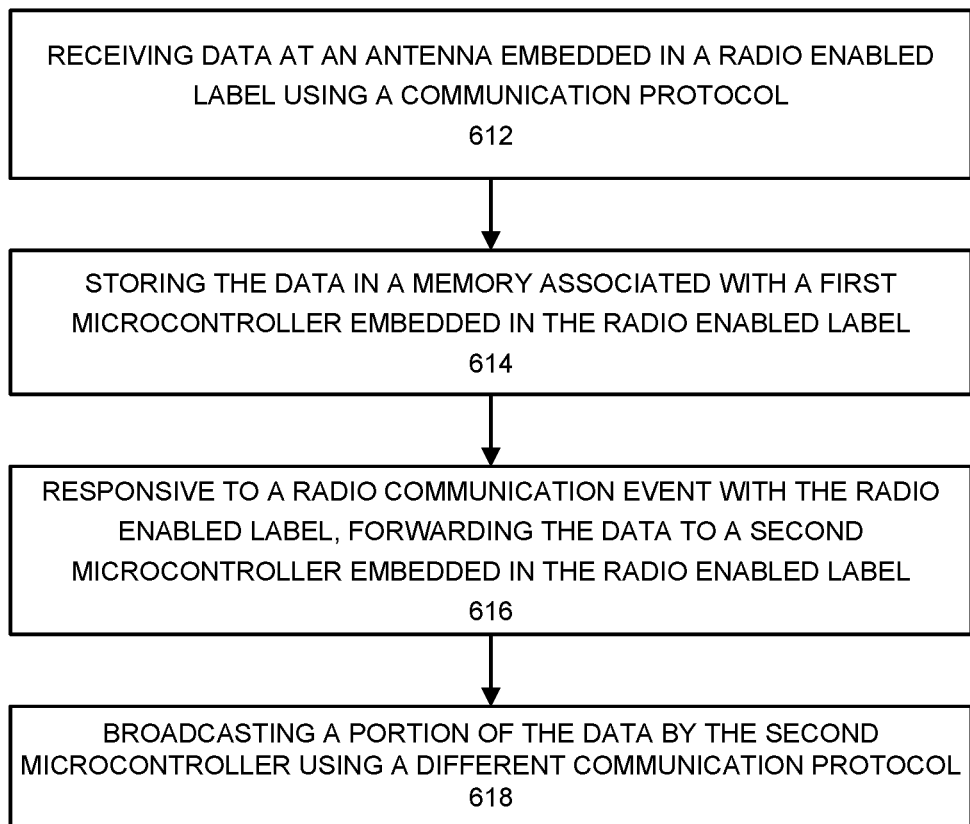
FIG. 6A illustrates an example method of operation according to example embodiments.
Figure 6B:
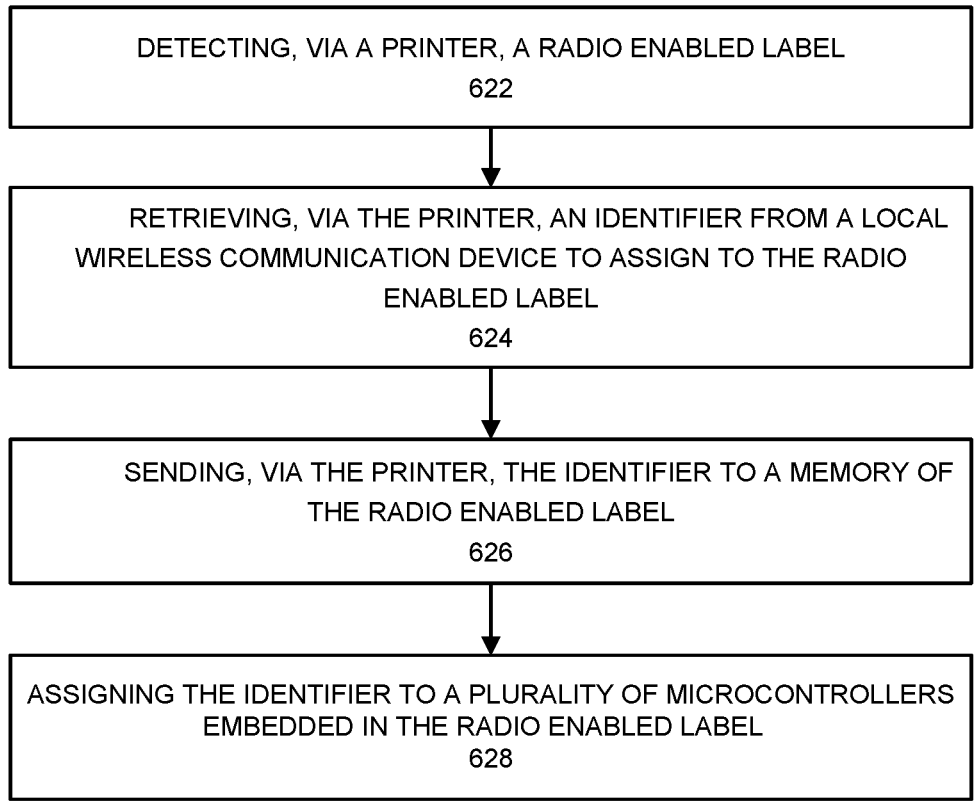
FIG. 6B illustrates another example method of operation according to example embodiments.

FIG. 6A illustrates an example process that includes receiving data at an antenna embedded in a radio enabled label using a communication protocol 612. The antenna may be activated by a radio transmission or similar power controlled signal that enables the antenna, the circuit and the battery to initiate a data receiving and/or transmission process. The process may also include storing the data in a memory associated with a first microcontroller embedded in the radio enabled label 614, such as the identification data for the label, data regarding the package associated with the label, etc. The process also includes responsive to a radio communication event with the radio enabled label, forwarding the data to a second microcontroller embedded in the radio enabled label 616 and broadcasting a portion of the data by the second microcontroller using a different communication protocol 618. The first controller may receive data that is used to provision the second controller by the first controller. This process enables the label to perform its own internal provisioning of a microcontroller that normally requires a data interface or a dedicated provisioning device, such as a BLE/Bluetooth microcontroller and/or a cellular enabled controller.

In one example, the data includes identifier information uniquely assigned to the radio enabled label. Also, the first microcontroller may be a radio frequency identification (RFID) microcontroller and the second microcontroller may be one or more of a BLE/Bluetooth or cellular microcontroller. The forwarding of the data may be performed via an internal communication bus embedded in the label. The radio communication event includes receiving a wireless location status request message via the antenna. The process may also include receiving a provisioning data message via a wireless access point, and the provisioning data message may include the data and may be sent from an identification server. The different communication protocol may include one or more of a cellular communication protocol and a Bluetooth protocol.

Another example embodiment may include a process that includes detecting, via a printer, a radio enabled label 622. The label may be moving through a motorized printer feeder that receives the paper/label and moves the label towards a print drum and printing interface. Along the movement route, the printer may have an embedded transceiver or an add-on transceiver that is near or affixed to the outside of the printer. The process may also include retrieving, via the printer, an identifier from a local wireless communication device to assign to the radio enabled label 624, sending, via the printer, the identifier to a memory of the radio enabled label 626, and assigning the identifier to a plurality of microcontrollers embedded in the radio enabled label 628. The information transfer, radio communication and/or assigning process may occur while the label is inside the printer, outside the printer, being printed on via an ink print portion of the printer, etc. The process may also include broadcasting the identifier to a computing device which forwards the identifier information to a database, and transmitting a beacon signal to the radio enabled label to identify a location of the radio enabled label after the identifier information is stored in the database. The printer may include among other components a memory, a transmitter and receiver and a radio frequency identifier (RFID) communication antenna. The process may also include printing alphanumeric characters on a surface of the radio enabled label while the identifier is sent to an antenna of the radio enabled label and the assigning the identifier to the plurality of microcontrollers embedded in the radio enabled label may include assigning the identifier to a radio frequency identifier (RFID) microcontroller and forwarding the identifier via a communication bus between the RFID microcontroller and one or more of a BLE/Bluetooth microcontroller and a cellular microcontroller. The process may also include broadcasting the identifier via one or more of the BLE/Bluetooth controller and the cellular microcontroller responsive to a received radio request for identification information.

Another example embodiment may include a label that includes a top surface to retain printed content, such as a paper surface or other printable surface, a bottom surface with a plurality of electrical lead contacts to receive an electrical power charge from an external power source. The bottom surface may also be a paper surface with the leads and other circuit components embedded between the top and bottom surfaces. The label may also include a power storing element embedded between the top and bottom surfaces, one or more radio antennas, and one or more microprocessors configured to receive identifier information received by the one or more radio antennas.

The label may also include for the plurality of electrical lead contacts, three lead contacts including a center tab, a ground tab and a positive voltage tab. The plurality of electrical lead contacts are connected to a respective plurality of leads which traverse across an area between the top and bottom surfaces to a corresponding set of electrical lead contacts on an opposite side of the label. The leads may instead traverse from one side to the other depending on the type of configuration. The label may be connected to another label such that the plurality of electrical lead contacts are in contact with a respective plurality of electrical lead contacts on the another label. The leads may be connected and the label material (i.e., paper) may have perforations for an easy tear operation to occur to separate the labels including the leads. Also, the label may be connected to yet another label on an opposite side such that the corresponding set of electrical lead contacts are in contact with a respective plurality of electrical lead contacts on the yet another label. The label, the another label and the yet another label are fan-folded on top of one another and may simultaneously receiving an electrical charge via an external charge source. The folded labels align the leads to be in contact so a charge can move from one lead to the next. The plurality of electrical lead contacts may include between 3 and 10 electrical lead contacts.

Another example embodiment may include a label that includes a top surface, a bottom surface, a plurality of electrical lead contacts, and a plurality of capacitors connected to the plurality of electrical lead contacts, and the plurality of electrical lead contacts and the plurality of capacitors are embedded between the top surface and the bottom surface of the label. The plurality of capacitors may be super capacitors with a capacitance over 1 Farad and which can receive a large amount of charge quickly and use the charge to provide charge to a battery. The plurality of electrical lead contacts may include two or more electrical lead contacts in contact with each of the plurality of capacitors. The plurality of capacitors are in contact with one or more batteries embedded between the top and bottom surfaces of each label. The label may be in contact with a plurality of other labels fan-folded and stacked on top of one another and the label, and an external charger providing a voltage source simultaneously to the plurality of electrical lead contacts of the label and to electrical lead contacts of the plurality of other labels. Also, in another example, a plurality of diodes are arranged between the plurality of electrical lead contacts and the capacitors, such as a single diode per lead. The plurality of electrical lead contacts may include six or more contacts which traverse an area length or width of the label.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 7:
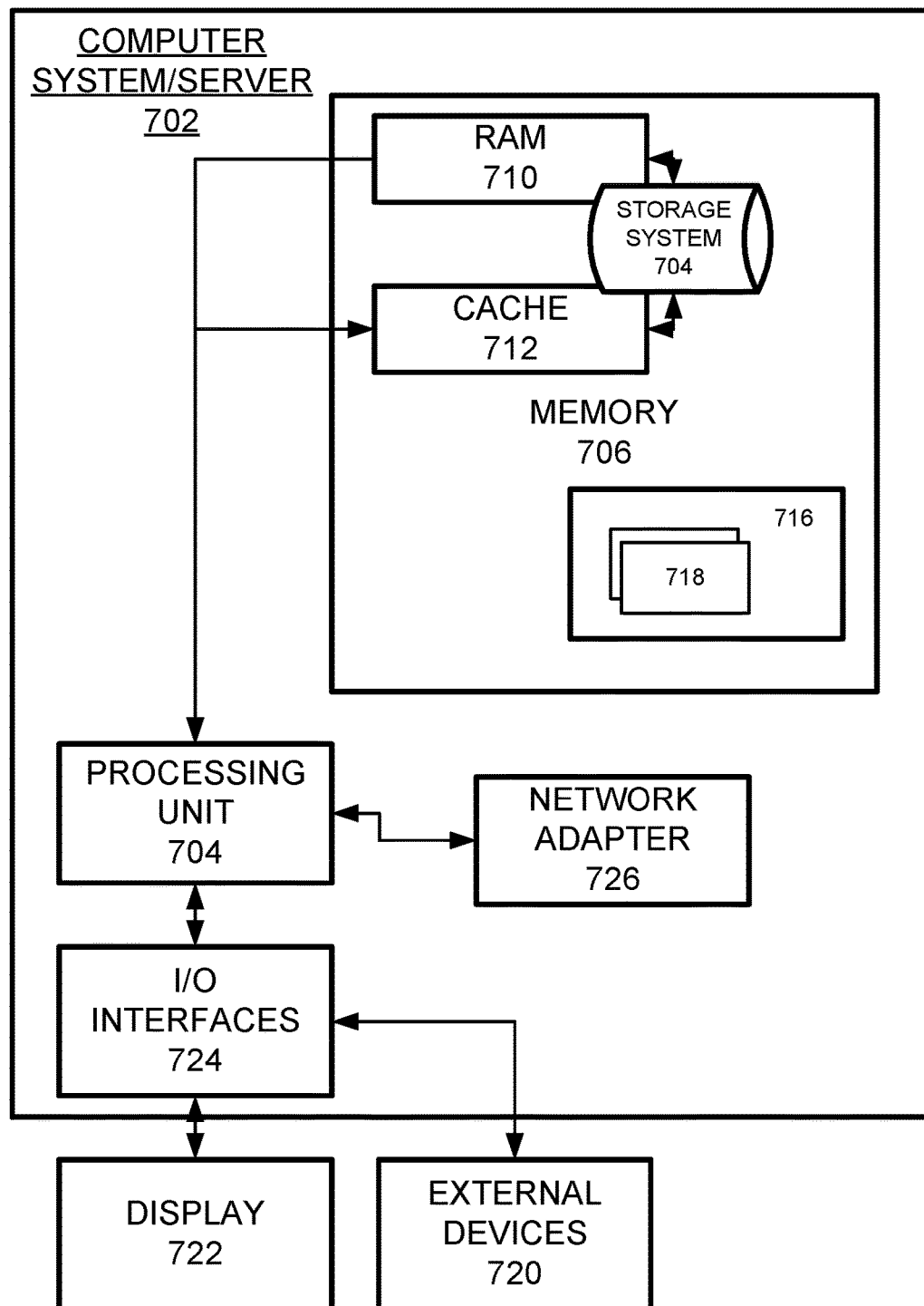
FIG. 7 illustrates a system configuration for storing and executing instructions for any of the example processes according to example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 7, computer system/server 702 in cloud computing node 700 is displayed in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not displayed, other hardware and/or software components could be used in conjunction with computer system/server 702. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising
receiving data at an antenna embedded in a radio enabled label using a communication protocol;
storing the data in a memory associated with a first microcontroller embedded in the radio enabled label;
responsive to a radio communication event with the radio enabled label, forwarding the data to a second microcontroller embedded in the radio enabled label; and
broadcasting a portion of the data by the second microcontroller using a different communication protocol;
wherein the radio communication event comprises receiving a wireless location status request message via the antenna.

2. The method of claim 1, wherein the data comprises identifier information uniquely assigned to the radio enabled label.

3. The method of claim 1, wherein the first microcontroller is a radio frequency identification (RFID) microcontroller and the second microcontroller is one or more of a Bluetooth low energy (BLE) or cellular microcontroller.

4. The method of claim 1, wherein the forwarding the data is performed via an internal communication bus embedded in the label.

5. The method of claim 1, wherein the different communication protocol comprises one or more of a cellular communication protocol and a Bluetooth protocol.

6. A non-transitory computer readable storage medium configured to store instructions that when executed cause a processor to perform:
receiving data at an antenna embedded in a radio enabled label using a communication protocol;
storing the data in a memory associated with a first microcontroller embedded in the radio enabled label;
responsive to a radio communication event with the radio enabled label, forwarding the data to a second microcontroller embedded in the radio enabled label; and
broadcasting a portion of the data by the second microcontroller using a different communication protocol;
wherein the radio communication event comprises receiving a wireless location status request message via the antenna.

7. The non-transitory computer readable storage medium of claim 6, wherein the data comprises identifier information uniquely assigned to the radio enabled label.

8. The non-transitory computer readable storage medium of claim 6, wherein the first microcontroller is a radio frequency identification (RFID) microcontroller and the second microcontroller is one or more of a Bluetooth low energy (BLE) or cellular microcontroller.

9. The non-transitory computer readable storage medium of claim 6, wherein the forwarding the data is performed via an internal communication bus embedded in the label.

* * * * *